July 14, 1953     E. MENZ ET AL     2,644,946
CORSET SPRING

Filed April 13, 1951                           2 Sheets—Sheet 1

Inventor
E. Menz
&
M.W. Schmidt
nee Loedel
by Bryant & Lowry
Attorneys.

Patented July 14, 1953

2,644,946

UNITED STATES PATENT OFFICE 2,644,946

CORSET SPRING

Emil Menz and Marie Wilhelmine Schmidt, née Loedel, Rothenburg ob der Tauber, Germany Application April 13, 1951, Serial No. 220,782
In Germany June 17, 1949

6 Claims. (Cl. 2—36)

This invention relates to surface tension springs for material of all kind, in particular corset springs or stays, and a device for their production. The surface tension springs according to this invention are elastic in longitudinal as well as in transversal direction and can be used in all cases which require to tension, stiffen or support surfaces or parts of materials, i. e. for example in the machine industry, in the production of tents, in the dress and clothing industry, in the production of body supporting articles, such as corsets, corselets, bodices, bust bodices, abdominal belts, bandages, knickers, bloomers, and the like.

It is already well known to substitute the usual straight, i. e. ruler-like, stay bars or busks by angularly bent or frame-shaped members which yield a surface supporting body or stay in a corset, corselet, bodice, or the like.

These said supporting bodies, however, have inconvenient disadvantages inasmuch as they generally effect pressure spots due to their substantially angular shape. The main deficiency of the known corset supporting members consists in the fact that they are only elastic in longitudinal sense of the several bars or busks as they are constituted by the usual leaf spring stay or busk type. As a result, such corset supporting members being rigid in a direction oblique to the longitudinal axis of the bars or busks are very inconvenient and troublesome for the user of a corset as they impair considerably the free movableness of the body.

It is, therefore, an object of the invention to provide surface tension springs for material of all kind, especially corset stays or springs, which are not loaded with the said disadvantages of the prior art stay bars or busks.

It is another object of the invention to provide an universally elastic (frame-like) corset supporting member by using a surface tension spring being not only elastic in its longitudinal extension as a usual spring steel busk, but also in its transversal extension. This surface tension spring or stay consisting, for example, of round, coiled or meandrous wire is suitably moulded so as to produce a "circular supporting stay" adapted to tension or to stiffen a surface or part of a surface of any material.

It is a further object of the invention to provide a surface tension spring or stay by fitting two meandrous wires into each other, i. e. by a translation of their axes, one of which having a left-hand winding and the other one a right-hand winding.

It is a still further object of the invention to provide a coiled flat ring free from internal stresses which serves as a circular supporting stay so as to avoid an inconvenient twist of the springs or stays.

It is a still further object of the invention to provide a device adapted to produce said coiled flat ring free from internal stresses.

With these and other objects in view which will become apparent as the specification proceeds, our invention will be best understood by reference to the following specification and claims and the illustrations in the accompanying drawings, in which:

Figure 1:
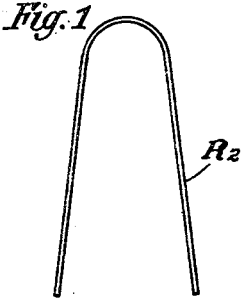
Fig. 1 is an elevation of a U-shaped surface tension spring or stay consisting of round wire.
Figure 2:
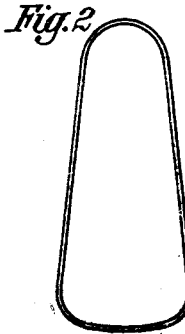
Fig. 2 is an elevation of an oval surface tension spring or stay consisting of round wire.
Figure 3:
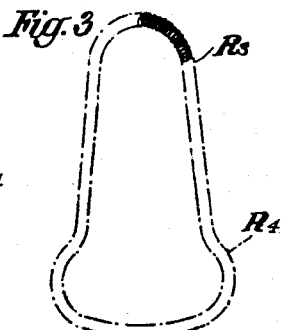
Fig. 3 is an elevation of an approximately oval surface tension spring or stay having a bulge and consisting of coiled wire.
Figure 4:
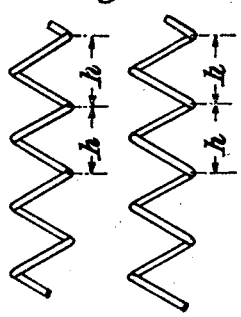
Fig. 4 is an elevation of two unjointed wire coils having opposite sense of winding.
Figure 5:
Fig. 5 is a top view of the wire coils shown in Fig. 4, flattened and fitted into each other.
Figure 6:
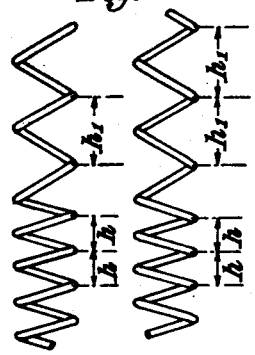
Fig. 6 is an elevation of two wire coils having different leads.
Figure 8:
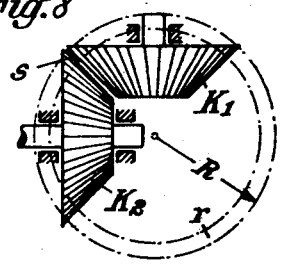
Fig. 8 is a diagrammatic plan view of a device for producing flat rings free from internal stresses such as shown in Fig. 7.
Figure 7:
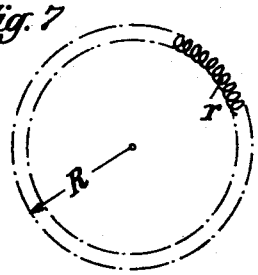
Fig. 7 is a plan view of a rolled flat ring consisting of coiled wire.
Figure 9:
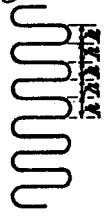
Fig. 9 is an elevation of a spring consisting of meandrous wire the loops of which having equal widths.
Figure 10:
Fig. 10 is an elevation of a spring consisting of meandrous wire the loops of which having different widths.
Figure 11:
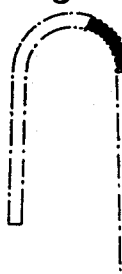
Fig. 11 is an elevation of a U-shaped surface tension spring consisting of sinuous wire.
Figure 12:
Fig. 12 is an elevation of an approximately oval surface tension spring having a bulge and consisting of meandrous wire.

The U-shaped circular supporting stay R2 shown in Fig. 1 is preferably used as a lateral support or stay for the side parts of a corset that has a front part $a$, side parts $b$ and $c$, and a lacing connection $d$ between the front and a side part C while the elongated crossed loops R1 and R3 in accordance with Fig. 2 or 3 respectively will advantageously serve as a body or stomach support. The embodiment of the invention shown in Figs. 1 and 2 consist of one or more round wires which may be twisted if desired. The round wire already accomplishes the main condition of the invention, namely, to be elastic in longitudinal and transversal sense if the material used will be suitable. In the constructions according to the Figs. 3 to 5 the elasticity in both directions is especially effective since the surface tension spring serving as a circular support or stay is made of coiled wire and provided with a bulge R4 as shown in Fig. 3. The lead of the coils is equal ($h$) and the turns are only flattened to such a degree that the several turns remain freely movable. Different leads, as shown in Fig. 6, make possible to govern and to adjust the desired spring action and supporting effect. Fig. 7 shows a flat-ring r having the radius R which can be produced by means of the device diagrammatically shown in Fig. 8. Said device preferably comprises a pair of taper rollers $K_1$, $K_2$ the diameter of which governs the radius of the flat rolled coiled wire ring and the base angles of the cones of which may differ. A coiled wire flat ring produced in this way will be persistent with respect to its shape as it is not influenced by any twisting force. The pair of taper rollers $K_1$, $K_2$ is fed at S with one or two combined coiled wires forming a straight bar so as to produce a flat ring free from internal stresses. Different compressive effects may be obtained by providing different leads. A general flux of force extending through the whole flat ring spring is assured by the fact that the several turns of the wire coils do not penetrate each other. The flux of force and, thence, the transversal elasticity will be reduced if the wire turns touch or even penetrate one another.

It is also possible to use sinuous wire for producing surface tension springs or circular supporting stays as shown in Figs. 9-12. The employment of sinuous wire, moreover, will simplify the construction and reduce the weight with respect to coiled wire. In accordance with an aforesaid feature of the invention also the widths of the loops of the sinuous wire springs may be varied so as to provide different resistances of the several spring parts.

According to the invention the surface tension springs may be, for example, preferably made of aluminium alloys, bronze and the like, or of suitably resistive plastics, such as synthetic rubber derivates (Buna), so as to prevent corrosion and to considerably reduce the weight.

The surface tension spring presents remarkable improvements and advantages. As the supporting member has longitudinal as well as transversal elasticity it assures a universally compensating effect. It fits, therefore, tightly, to the contour of the body so that any troublesome pressure points or spots are avoided. The free movableness of the user of such a corset or the like will not be restricted. Corset-like articles provided with surface tension springs according to the invention are also suitable for convalescents, operated persons, and during the time of pregnancy for disburdening or relieving the cicatrices or the body in a uniform manner so that paroxysmic or vascular engorgements and the like will not occur.

Figure 13:
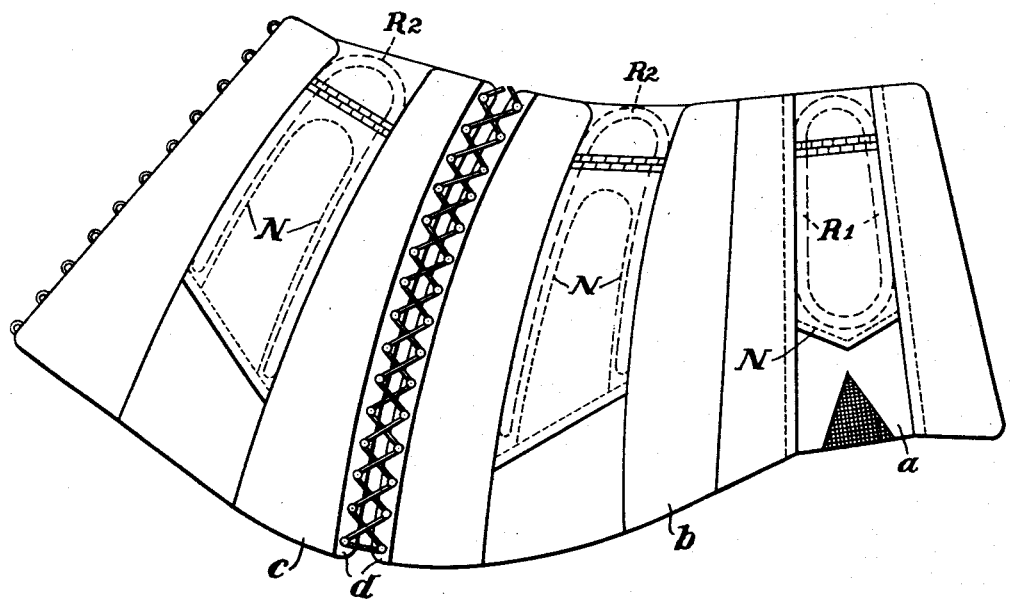
Fig. 13 is an opened perspective view of a corset equipped with pockets for the reception of the surface tension springs of the stays.

The surface tension spring or corset supporting member according to the invention is connected in known manner with the corset, bodice, abdominal belt, underwear, knickers, or the like by means of seams following the outer and inner bounding lines of said spring or member. It is preferred to provide a seam at the outer line only so as to form a pocket N which allows to easily interchange the springs. Due to its uniform elasticity this convenient interchangeability, which is a further advantage of the invention, is also assured if said pocket will be narrower at its top than at its bottom as shown in Fig. 13, for example, in case of a lower bulge of the spring, as shown in Fig. 3.

The manner of using and applying the illustrative embodiments of our invention set forth above will be clear from the foregoing description. While the embodiments of the invention hereinbefore particularly described constitute preferred forms, it is to be understood that other forms might be adapted according to practical requirements within the scope of the appended claims.

Various changes and modifications may be made in the surface tension spring and device for its production set forth and in the structural details shown, without departing from the spirit and the leading ideas of this invention.

What we claim is:

1. In combination with a corset having a stay-receiving pocket in the front part thereof, a surface tension spring for use as a corset stay removably mounted in the pocket and forming a supporting member, said stay comprising a flat ring of a diameter greater than the diameter of the pocket wall and formed of overlapping spirals and being resilient in longitudinal and transverse directions when placed in said pocket.

2. In combination with a corset having a stay-receiving pocket in the front part thereof, a surface tension spring for use as a corset stay removably mounted in the pocket and forming a supporting member, said stay comprising a flat ring of a diameter greater than the diameter of the pocket and formed of overlapping single spirals and being resilient in longitudinal and transverse directions when placed in said pocket.

3. In combination with a corset having a stay-receiving pocket in the front thereof, a surface tension spring for use as a corset stay removably mounted in the pocket and forming a supporting member, said stay comprising a flat ring of a diameter greater than the diameter of the pocket and formed of overlapping double spirals and being resilient in longitudinal and transverse directions when placed in said pocket.

4. In combination with a corset having stay-receiving pockets in the front and sides thereof, a surface tension spring for use as a corset stay removably mounted in each pocket and forming a supporting member, some of said stays being of U-shape and mounted in the side pockets with the legs of the stays directed downwardly and resiliently engaged with the side walls of the pockets, and another stay of closed loop formation mounted in the front pocket and of a diameter greater than the diameter of the pocket, said stays being resilient in longitudinal and transverse directions when placed in said pockets.

5. A corset as in claim 4, wherein the closed loop stay in the front pocket is of flat double spiral ring formation.

6. A corset as in claim 4, wherein the closed loop stay is of generally oval formation and bulged at opposite sides.

EMIL MENZ.
MARIE WILHELMINE SCHMIDT,
 NÉE LOEDEL.

References Cited in the file of this patent

UNITED STATES PATENTS

| Number | Name | Date |
|---|---|---|
| 260,915 | Wells | July 11, 1882 |
| 1,083,398 | Grean | Jan. 6, 1914 |
| 1,207,104 | Wallace | Dec. 5, 1916 |
| 1,284,531 | Worrest | Nov. 12, 1918 |
| 2,133,004 | Williams et al. | Oct. 11, 1938 |
| 2,489,388 | Rubin | Nov. 29, 1949 |

FOREIGN PATENTS

| Number | Country | Date |
|---|---|---|
| 244,948 | Great Britain | Dec. 31, 1925 |
| 369,204 | Great Britain | Mar. 11, 1932 |
| 487,646 | Great Britain | June 23, 1938 |
| 982,370 | France | Jan. 24, 1951 |